United States Patent Office 2,802,443
Patented Aug. 13, 1957

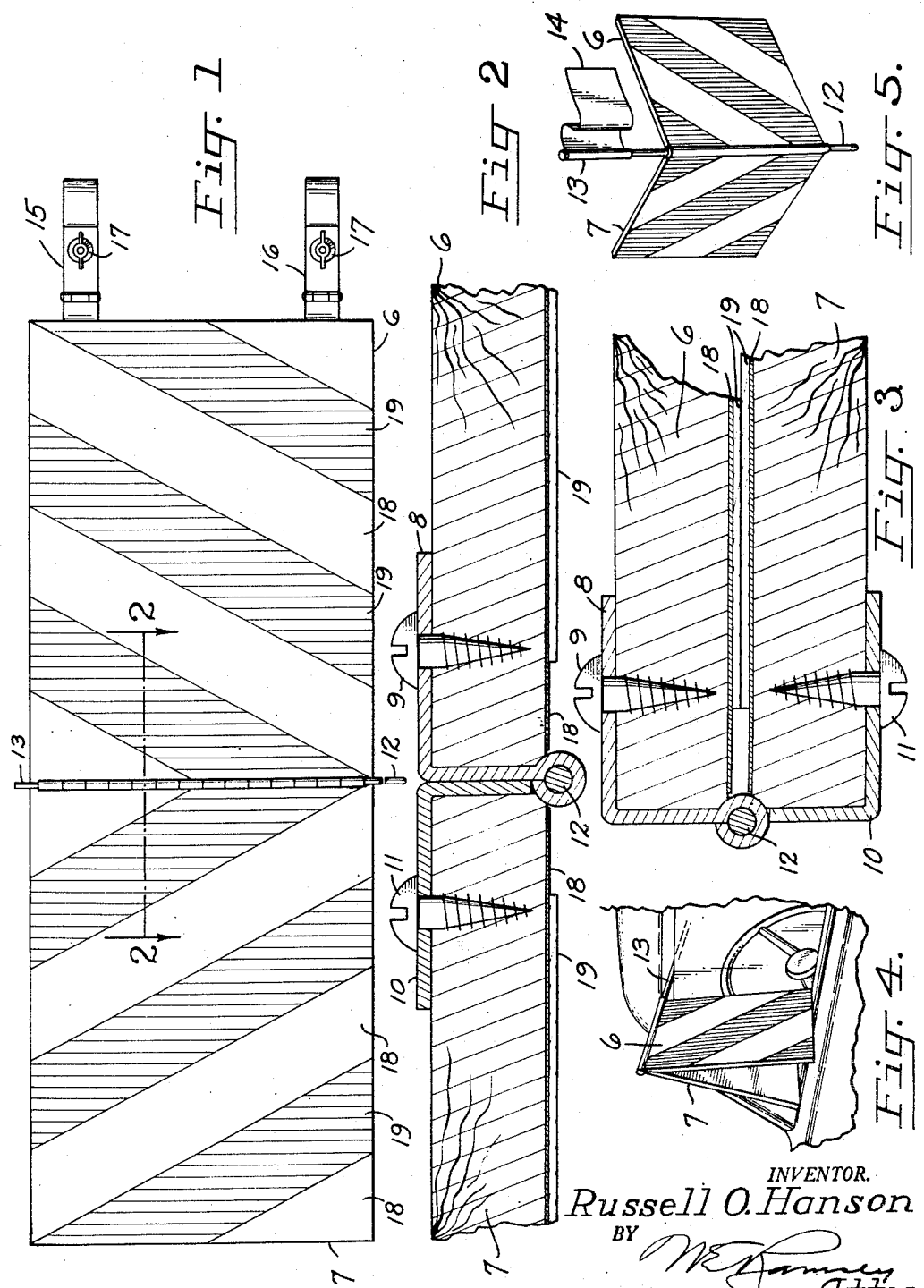

2,802,443

REFLECTIVE TYPE WARNING SIGN

Russell O. Hanson, Portland, Oreg.

Application October 18, 1954, Serial No. 462,955

3 Claims. (Cl. 116—63)

This invention relates to a portable reflective warning sign and safety device for exhibition by motorists and truck operators when a vehicle is stalled or parked on or adjacent to a travelled thoroughfare.

One object of my invention is to provide a portable reflective warning sign which is inexpensive, yet brightly reflective, in service to the mass market available thereto, and one which is constructed with hinged halves having allochiral warning patterns whereby folding of the halves into direct face-to-face abutment of the bright yet fragile warning patterns will protect the latter against wear, dirt, abrasion or other damage and thus preserve the reflective qualities of the sign.

Both public and private safety supervisors and engineers long have recognized the need for an improved "road flare" type warning device for motorists and truckers which will function for a long period of time without extinguishment, will generate or reflect a warning light or pattern with sufficient brilliance to attract immediate attention, and will sell for a low price allowing purchase and use by large numbers of the motoring public. To this end, there recently has come upon the market a thin flexible tape and sheet material, often supplied with a pressure sensitive adhesive or other backing, which material is more than 170 times as bright as the white line on the highway in light reflective qualities. Various forms of this reflective material have gained wide acceptance in the fabrication of highway, warning, safety and construction signs and by motorists as a red colored strip or tape reflective warning material applied directly to bumpers, fenders and other portions of automobiles and trucks. It is a reflective material of this type which I employ in the instant invention since it will function for a long period of time without extinguishment, the warning generated by the material being dependent upon reflection or the return of light from headlights or other sources rather than upon a generation of light as with the ignition type road flare. Further, the brilliance of the material and the ready availability and low cost thereof all are ideal for use in a portable reflective warning sign of my inventive type.

The warning sign of this invention finds two main fields of use. Firstly, when a truck or automobile is stalled, parked or otherwise stationary upon or adjacent to a highway so as to constitute a hazard, a warning must be given to an approaching motorist. For example, a loaded truck may be required to pull to the side of the road to effect repairs or change a tire, an accident may require a police vehicle or ambulance to stop in a position partially obstructing a roadway, or a lack of storage garage facilities may require an urban motorist to park his automobile at a curb or side of a heavily travelled street at night. In any of these or similar situations, a reflective warning sign of my inventive type, properly positioned and displayed to gain the immediate attention of other approaching motorists, may be saving of life and property. Thus, it is contemplated that my warning sign and safety device will be portable and will be carried in or upon a vehicle at all times so as to be available in the event of an emergency.

A second important use of my invention is by utility and construction companies in conjunction with the effecting of repairs and the erection of facilities at night on or adjacent to the highway or street. For example, telephone and light crews often must repair transmission lines, gas crews must effect emergency repairs to pipe lines, and road crews must repair roadbeds, bridges and manholes at night with their utility and construction vehicles parked closely adjacent to or directly upon the highway. By providing a portable reflective warning sign for these crews, both the parked vehicle and the working crew are protected against damage and injury.

Having determined the need for a sign as above described, certain requirements of construction and arrangement of parts as provided by my invention will appear logical. Thus, although the previously mentioned thin strip or tape form of flexible light reflecting material is exceptionally brilliant in reflective qualities and easy to apply in fabrication of a sign, yet it is possessed of certain inherent disadvantages. Firstly, it is quite weak and fragile structurally and the brilliancy thereof is materially reduced by a coat of dust, dirt, or other similar overlying material. Secondly, as is evident from the above described uses to which a portable warning sign or safety device is put, exposure to the elements and to traffic, severe usage, tearing, crushing and other mutilation can be expected while the sign is used and while it is stored in the crowded bed of a utility truck or in the trunk of a passenger vehicle. Because of these factors, it has heretofore been deemed impractical to utilize the described thin strips or tapes on a reflective warning sign which is expected to survive for a reasonably long life under conditions of severe usage. With my improved construction, however, there is now provided and it is an object of my invention to provide a portable reflective warning sign which is exceptionally efficient and brilliant in reflective quality by reason of the utilization of the previously described reflective material, yet which is articulated and pivoted with allochiral warning patterns to the end that the patterns can be folded into face-to-face abutment when the sign is not in use to protect the fragile warning material against wear, fracture and dirt.

Another object of my invention is to form the allochiral reflective patterns of the warning sign with raised lands of reflective material whereby the folded position of the sign will be with the raised pattern in exact abutment while the grooved remainders of the pattern are spaced slightly, thus assuring a maximum protection for the more fragile portions of the sign even after slight warping or bending of the sign itself has occurred due to the severe usage which can be anticipated.

These and other objects and advantages of my invention will be set forth in the specification which follows, taken in conjunction with the accompanying drawings, wherein:

Fig. 1 is a frontal elevation of the reflective warning sign showing the allochiral pattern and the spaced attachment means at one side for hanging the sign from a utility truck or the like, the pintle pin of the hinges across the center of the sign being foreshortened in this view;

Fig. 2 is a detail section view, taken substantially on the line 2—2 of Fig. 1, showing the arrangement of the first and second rectangular sign plates and the hinge halves when the sign is in an open side by side position for display;

Fig. 3 is a section view similar to Fig. 2 but with the two sign plates closed in a frontal face-to-face abutment position for storage, this figure illustrating the manner in which the strips of light reflective material define raised lands spaced by grooves which are in the plane of the flat face of each sign plate;

Fig. 4 is a partial perspective view of one form of my reflective warning sign wherein the pintle pin of the hinge protrudes a substantial distance from the hinge and the two sign plates are adapted for pivotal movement back toward one another, this arrangement allowing the sign to be supported in a substantially horizontal position from the window on the driver's side of a parked automobile;

Fig. 5 is a perspective view of a sign in which the protruding pintle pin defines a staff for the attachment of a warning flag, the sign and flag here being positioned at rest on one edge adjacent a highway obstruction.

As a comparison of Figs. 1 and 2 will indicate, the reflective warning sign comprises a first rectangular sign plate 6 and a second rectangular sign plate 7, both of substantially the same size. Each of these sign plates is provided with flat front and back faces bounded by straight marginal edges and spaced by a substantial thickness of backing material. Thus, the body of each sign plate 6 and 7 is formed of a rigid solid material such as plywood or metal adapted to resist wear and abrasion and to withstand severe usage. Safety engineers and traffic consultants recognize that these attributes are a practical necessity for portable warning and safety signs.

One marginal edge of each of the sign plates carries one-half of a mated hinge means for folding the plates about the hinge as a pivot axis. To this end, the hinge half 8 is angular in form and is secured, as by screws 9, to the back of the plate 6 and the allochiral hinge half 10 is secured, as by screws 11, to the back of the plate 7. The angularity of each hinge half conforms to the angularity of the corresponding sign plate edge. As best shown in Figs. 4 and 5, a straight pintle pin 12 joins the hinge halves 8 and 10 and protrudes a substantial distance from both ends of the hinge, the reference numerals 12 and 13 indicating the two protruding portions. This pivot pin coacts with the hinge halves 8 and 10 to allow the sign plates to pivot between a frontal face-to-face abutment position for storage as shown in Fig. 3 and an open side by side position for display as shown in Fig. 2. Additionally, the protruding end 13 of the pintle pin defines a staff for the attachment of a warning flag 14 when the sign plates are displayed arranged upon a highway as shown in Fig. 5. Optionally, the edges of the sign plates 6 and 7 may be beveled off and the hinges made to conform thereto to allow the two halves to swing substantially 360 degrees into a substantially back to back display position as shown in Fig. 4. The protruding portion of the pintle pin 13 then serves as a supporting standard for hanging the warning sign with the standard in a substantially horizontal position as hereinafter will be described.

Returning to Fig. 1, there optionally is secured to the right marginal edge of the sign plate 6 a pair of spaced attachment means 15 and 16. Each of these attachment means includes a hinged clamp element and wing nut 17 adapted, in pairs, to support the warning sign upon a vertical standard, pipe, pole or the like. When so supported, the two halves 6 and 7 can be closed together into face to face abutment in the storage position of Fig. 3 and, thereafter, bodily swung about the hinged pivots of the clamp elements 15 and 16 into a position substantially perpendicular to the plane of the sheet of drawings. Additionally, the clamps 17 allow the sign to be mounted and to be taken down with ease when the occasion demands.

The diagonal reflective pattern of each sign plate 6 and 7 is formed on the flat front face thereof from a thin flexible tape or sheet material conventionally marketed with a pressure sensitive adhesive backing and capable of reflecting light with a high brilliance. In fabricating the sign, I prefer to paint the entire front face surface with one color, the reference numeral 18 in Figs. 2 and 3 indicating a layer of such a paint coating applied to the flat faces. Thereafter, plural spaced strips of the aforementioned brilliant but somewhat fragile light reflective material 19 are secured to the flat front faces in a diagonal pattern overlying the coated surface 18. As those skilled in the sign art will recognize, the strips may be secured with a pressure sensitive adhesive or with glue or they may be baked on. Thus, irrespective of the precise means of attachment, the strips 19 define flat raised lands of light reflective material which are spaced by flat grooves of the coating 18 lying substantially in the plane of each flat face (see Figs. 2 and 3).

In fabricating the sign faces with the above described light reflective material, it is an important feature of my invention that the diagonal patterns be arranged allochiral as shown in Figs. 1, 4 and 5. That is to say, the light reflective patterns on the sign plates 6 and 7 are symmetrical and are identical except that they differ as right and left hands. This allochiral arrangement of the reflective patterns allows the sign plates 6 and 7 to be folded about the hinge into frontal, face-to-face abutment for storage as shown in Fig. 3 with the reflective strips or lands 19 in direct abutment. That is to say, the raised lands defined by the reflective material 19 on the face of the sign plate 6 will mate with and about the corresponding elements on the face of the sign plate 7 when they are folded together in definition of a protective or covered storage position. In this latter position, the fragile and somewhat weak strips of reflective material are protected while the sign is stored or otherwise not in use, the protection not only providing a clean surface in preservation of the brilliance when once again the sign is opened and used, but also serving to protect the reflective material against wear, peeling, scratching and fracture such as otherwise would occur with the intended use of the sign.

As an exemplary use of my novel portable reflective warning sign and safety device, it will be assumed that a motorist with a passenger vehicle carries one of the signs in the trunk of his automobile. Quite apparently, were the thin, fragile strips of reflective material left exposed to abrasion and accumulated dirt while stored, the sign would lose a portion or all of its brilliance and would be ineffective for its intended use. Accordingly, the motorist will carry the sign folded in the storage position of Fig. 3 so that the reflective material on one face overlies and abuts that on the other face. If it is assumed that the motorist in question is required to park his automobile at the curb or beside the road overnight because of a lack of garage facilities or because of a breakdown of the automobile, the warning device either will be displayed through the rear window or will be arranged with the position of the parts as shown in Fig. 4. In this figure, the left front window of an automobile is shown, it being assumed that the automobile is parked with the left side thereof toward the center of the highway or street. After unfolding the sign, the motorist rolls the left front window down an inch or so and inserts the long protruding portion of the pintle pin 13 through the window opening. Thereafter, the window again is raised, pinning and catching the standard 13 between the glass and the channel of the window with the sign plates 6 and 7 hanging outside the window as shown in Fig. 4. Because of the intense brilliance of the reflective warning material 19, actual tests have shown that this type of a safety device will pick up the headlights of oncoming cars from either direction on the highway or street and cause the drivers of these oncoming automobiles to veer away from the parked and protected vehicle. Thus, the reflective material is more than one hundred seventy times as bright as a white line on the highway in light reflecting quality when the material is clean and the diagonal pattern is suggestive of danger and warning. Further, since the reflective surface of the sign plate 6 faces in one direction and the reflective surface of the sign plate 7 faces in the opposite direction, the parked automobile is protected and oncoming motorists will be warned away from the parked vehicle irrespective of their direction of approach.

As a second exemplary use, it will be assumed that my reflective sign is carried on a utility truck such as commonly is utilized by telephone repair crews. In this instance, the hinged clamp elements 15 and 16 are employed to secure the sign to the body of the utility truck when the truck is parked close to a highway or directly in the traveled portion of the street or highway in order to effect line or cable repairs. By swinging the sign plates to the open position of Figs. 1 and 2, an effective, brilliant warning device is provided to warn oncoming motorists that the utility truck is not moving, that the crew is working on or near the highway and that a consequent danger exists. When not in use, the sign either is folded together and against the side of the utility truck or else the hinged clamps 17 are loosened, the sign is folded to the position of Fig. 3, and is deposited in the bed of the utility truck. As those skilled in the art will appreciate, safety signs utilized by such repair crews are subject to daily and to severe wear and usage. Were the reflective strips 19 not protected, the sign soon would lose its brilliance. With my warning sign, however, the reflective material is protected in the storage or folded position of the parts and only the backs of the sign halves are exposed to wear and rough treatment during transportation in the bed of the truck. That is to say, I have determined from work with such utility crews and with safety engineers that the effectiveness of a warning and a safety sign is dependent substantially entirely upon the protection of the reflective facing and not at all upon the condition of wear or dirt of the back of the sign. Thus, by providing for the allochiral pattern and the resultant abutment of the reflective material 19 when not in use, the sign of my invention will be protected and will be brilliant to serve its intended warning function over a long life.

Yet another exemplary use of my sign is by a motorist or truck driver as an emergency repair or warning device. Thus, the protruding portion of the pintle pin 13 can be utilized as a staff for the attachment of a warning flag as shown in Fig. 5 and this entire device carried in the trunk of an automobile or in the cab or bed of a truck.

When the automobile or truck is required to stop on the highway due to engine malfunction or to change a tire, or while the truck drivers sleep during a long haul, the sign need only be unfolded and rested on the shoulder of the highway or immediately to one side of the stalled vehicle in the position of Fig. 5. As therein shown, the brilliant reflective pattern will warn oncoming motorists away from the parked vehicle and, during the daylight hours, the warning flag 14 will serve the same function. When not in use, of course, the folded or storage position of the parts of the sign once more is effected to protect the fragile reflective strips 19.

In summation, it will be seen that the fabrication of a warning sign as above described employs materials readily available upon the market and is extremely simple and inexpensive, yet is brilliant and is effective for the intended purpose. Thus, I have provided a portable reflective warning sign which is exceptionally brilliant in reflective qualities yet which is pivoted and formed with allochiral warning patterns to the end that the patterns can be folded into face-to-face abutment when the sign is not in use to protect the fragile warning material against wear, fracture and dirt. Additionally, I have provided a sign which is inexpensive to fabricate in service to the mass market which is available because of the recognized need for an improved warning device for motorists and truckers. Additionally, my warning sign and safety device will function for a long period of time, will generate or reflect a warning light or pattern with a sufficient brilliance to attract immediate attention, and will sell for the low price allowing purchase and use by large numbers of the motoring public. It thus is the simplicity of the device which yields the advantage thereof.

I claim:

1. A portable reflective warning sign, comprising first and second rectangular sign plates of the same size having flat front and back faces, the body of each said sign plate being formed of rigid solid material adapted to resist wear and fracture, and to support the sign on edge for display, one marginal edge of each said sign plate carrying one-half of a mated hinge means for folding the plates about the hinge as a pivot axis, a pintle pin joining said hinge halves and protruding a substantial distance from both ends thereof, one end of said pintle pin defining a staff for the attachment of a warning flag when said sign plates are rested and displayed on edge, the other protruding end of said pintle pin being shorter than said one end and defining a protruding support element when the sign plates are rested on edge, and plural spaced strips of light reflective material overlying and arranged in a diagonal pattern upon each said flat front face to define raised lands of reflective material spaced by grooves, said diagonal patterns being allochiral about the hinge axis.

2. A reflective highway warning sign, comprising first and second rigid rectangular sign plates of the same size, each said plate having flat front and back faces bounded by straight marginal edges and spaced by a substantial thickness, the body of each said sign plate being formed of rigid solid material adapted to support the weight of the signs and to resist wear and fracture, adjacent marginal edges of said sign plates carrying the mated halves of a hinge means for folding the plates about the hinge as a pivot axis between a frontal face-to-face abutment position for storage and an open side-by-side position for display, a straight pintle pin joining said mated hinge halves and protruding a substantial distance from both ends thereof, one end of said pintle pin defining a staff for the attachment of a warning flag when said sign plates are displayed in said open position, the other protruding end of said pintle pin being shorter than said one end, that marginal edge of said second sign plate which is opposite the marginal edge carrying a hinge half having spaced attachment means for displaying the warning sign in said open position, and fragile strips of brilliantly reflective material arranged in an allochiral warning pattern means upon said two flat front faces to register the patterns in direct and exact abutment in protection of the reflective material when said sign plates are pivoted about said hinge means pivot axis to said closed storage position.

3. A reflective warning sign, comprising first and second rigid rectangular sign plates of the same size having flat front and back faces, one marginal edge of each said sign plate carrying one-half of a mated hinge means for folding the plates about the hinge as a pivot axis, a straight pintle pin joining said hinge halves and protruding a substantial distance from both ends thereof, one end of said pintle pin defining a staff for the attachment of a warning flag when said sign plates are displayed in an open position, the other protruding end of said pintle pin being shorter than said one end and defining a support element, that marginal edge of said second sign plate which is opposite the marginal edge carrying a hinge half having spaced attachment means for hanging the warning sign from a truck or the like, each said attachment means including a detachable hinged clamp element arranged in pivot about an axis parallel said first mentioned pivot axis to swing the entire sign into a retracted nested position adjacent the point of attachment for storage, and plural spaced strips of light reflective material secured flatwise in an overlying diagonal pattern upon each said flat front face to define flat raised lands of reflective material spaced by flat grooves lying in the plane of each flat face, the diagonal patterns on said first and second front faces being allochiral, the folding of said sign plates about said mated hinge means into frontal face-to-face abutment for storage bringing the reflective strips on one face into direct abutment with the reflective strips on the other face in protection of the strips against wear, dirt and damage.

References Cited in the file of this patent
UNITED STATES PATENTS

| | | |
|---|---|---|
| 1,133,583 | Simmons | Mar. 30, 1915 |
| 2,117,201 | Miller | May 10, 1938 |
| 2,432,928 | Palmquist | Dec. 16, 1947 |
| 2,561,016 | Ford | July 17, 1951 |
| 2,613,463 | Transue | Oct. 14, 1952 |